United States Patent [19]

Smith

[11] Patent Number: 5,650,865
[45] Date of Patent: Jul. 22, 1997

[54] HOLOGRAPHIC BACKLIGHT FOR FLAT PANEL DISPLAYS

[75] Inventor: Ronald T. Smith, Torrance, Calif.

[73] Assignee: Hughes Electronics, Los Angeles, Calif.

[21] Appl. No.: 408,049

[22] Filed: Mar. 21, 1995

[51] Int. Cl.⁶ .............................. G02B 5/32; G02B 6/10; B60Q 1/44; G03H 1/00
[52] U.S. Cl. .................. 359/15; 359/19; 359/34; 385/146; 346/479; 349/61
[58] Field of Search .................. 359/34, 15, 19, 359/48; 340/468, 479; 385/146

[56] References Cited

U.S. PATENT DOCUMENTS

| | | | |
|---|---|---|---|
| 5,101,193 | 3/1992 | Smith et al. | 359/19 |
| 5,237,641 | 8/1993 | Jacobson et al. | 385/146 |
| 5,303,322 | 4/1994 | Winston et al. | 385/146 |
| 5,341,230 | 8/1994 | Smith | 359/25 |
| 5,418,631 | 5/1995 | Tedesco | 359/15 |
| 5,515,184 | 5/1996 | Caufield et al. | 359/15 |

*Primary Examiner*—Paul M. Dzierzynski
*Assistant Examiner*—Audrey Chang
*Attorney, Agent, or Firm*—Leonard A. Alkov; Wanda K. Denson-Low

[57] ABSTRACT

An improved holographic backlight and liquid crystal display system. The holographic backlight comprises a cold cathode fluorescent tube for providing white light, and a light pipe disposed to receive the white light. A phase retarding film layer is attached to a first surface of the light pipe. A double-layer reflection/transmission hologram is disposed on an output surface of the light pipe opposite the film layer. Light from the cold cathode fluorescent tube is injected into the light pipe, and is diffracted off of the double-layer hologram. This produces quasi-collimated s-polarized light having well-defined spectral colors that is transmitted by the hologram in an array of red, green, and blue patches of light corresponding to the clear apertures of the red, green, and blue elements of an active matrix liquid crystal display. The result is a liquid crystal display with high display brightness, reduced battery power requirements, increased battery lifetime, and high contrast over a wide viewing angle.

15 Claims, 5 Drawing Sheets

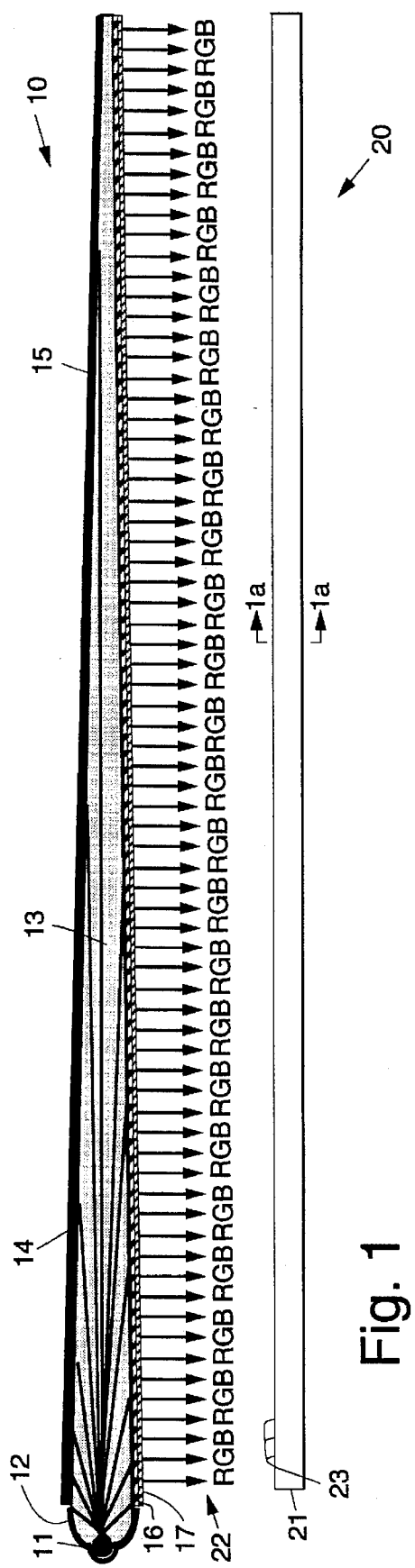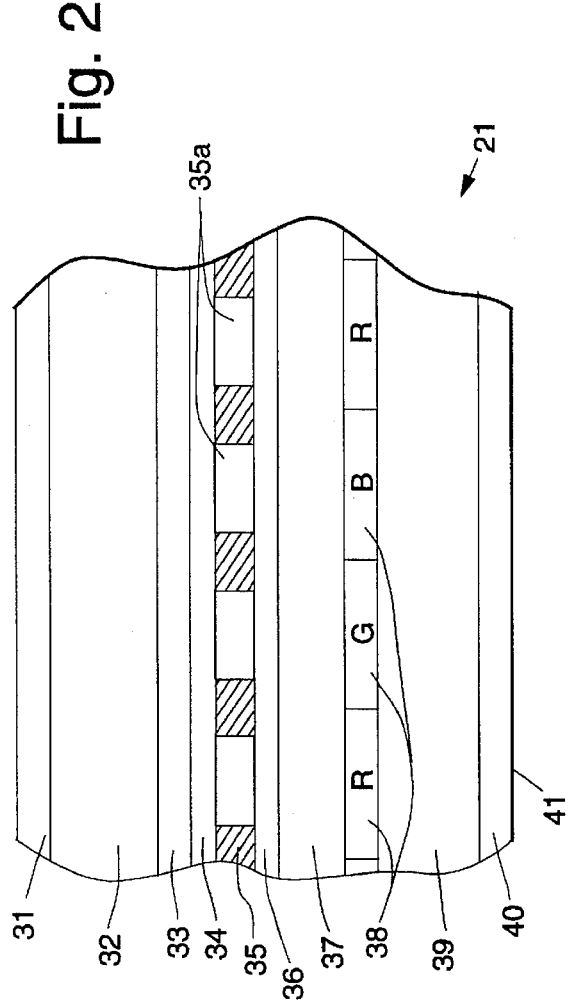
Fig. 1
Fig. 2

HOLOGRAPHIC BACKLIGHT FOR FLAT PANEL DISPLAYS

BACKGROUND

The present invention relates to flat panel displays, and more particularly, to improved holographic backlights and liquid crystal display systems employing them.

The assignee of the present invention manufactures holograms for use in holographic lighting devices and in holographic displays, including flat panel displays, and the like. Patents of the assignee of the present invention that are somewhat related to the present invention include those related to trapped beam holographic displays and lighting devices, and include U.S. Pat. No. 5,101,193 entitled "Universal stand-alone Holographic Center High Mounted Stoplight", U.S. Pat. No. 5,347,435 entitled "Linear Lamp Trapped Beam Holographic Center High Mounted Stoplight", and U.S. Pat. No. 5,341,230 entitled "Waveguide Holographic Telltale Display".

Existing color flat panel displays for laptop computers include a backlight, a red/green/blue absorptive filter, and an active matrix liquid crystal display. The backlight includes one or multiple cold cathode fluorescent tubes which inject light into a light pipe that is designed to gradually couple light out over the entire surface of the light pipe. In this manner, it is possible to provide an emitting surface of uniform brightness white light. The white light passes through the red/green/blue absorptive filter and then the active matrix liquid crystal display to create a color image.

However, there are a number of disadvantages of this technology that limits the performance of conventional flat panel displays. A conventional backlight emits nearly randomly polarized light. However, an active matrix liquid crystal display has a linear polarizer at its input side and therefore filters out more than 50% of the randomly polarized light. This results in relatively low transmittance of light from a conventional backlight through the active matrix liquid crystal display.

The light from a conventional backlight is uniformly emitted over the backlight surface, but the active matrix liquid crystal display elements have clear apertures over only about 40% of their surface to make room for electronics. Therefore, a large portion of light emitted from current backlights is wasted because it is blocked by the opaque portions of the active matrix liquid crystal display.

The emitted light from a conventional backlight is uniformly white light over the entire surface of the backlight. However, each of the red/green/blue filters is designed to be transmissive for one color only (red, green, or blue). Therefore, the transmittance of this light through the red/green/blue filter is only 20–30%.

Current backlights emit light over a wide angular field of view. However, the active matrix liquid crystal display works with high contrast only for light that is incident at a near-normal angle relative to the display surface. Therefore, current displays lose contrast rapidly as one moves his or her viewing location away from normal.

Therefore, it is an objective of the present invention to provide for improved holographic backlight liquid crystal display systems employing holographic backlights that overcome the limitations of conventional displays and improved liquid crystal display systems employing the holographic backlights.

SUMMARY OF THE INVENTION

In order to meet the above and other objectives, the present invention provides for a thin holographic backlight and liquid crystal display system. The holographic backlight is comprised of a cold cathode fluorescent tube outputting white light and a flat tapered light pipe disposed to receive the light output from the fluorescent tube. A phase retarding film layer is attached to a first surface of the light pipe. A double-layer reflection/transmission hologram is disposed on a second, output surface of the light pipe opposite to the first surface. To form the liquid crystal display system, a liquid crystal display, or active matrix liquid crystal display is disposed to receive light that is transmitted by the double-layer hologram.

Light from the cold cathode fluorescent tube is injected into the light pipe, and is diffracted off of the double-layer hologram. This produces quasi-collimated s-polarized light having well-defined spectral colors. The s-polarized light is diffracted by the hologram and (or emitted from the light pipe) in an array of red, green, and blue patches of light. These red, green, and blue patches of light correspond to red, green, and blue elements of the liquid crystal display.

In contrast to conventional backlights that emit nearly randomly polarized light, the present invention emits mainly s-polarized light which passes through the polarizer of the active matrix liquid crystal display with high transmittance. Since the light emitted from the holographic backlight is highly polarized, it may be possible to remove the first polarizer in the active matrix liquid crystal display. In the present invention, light is emitted from the light pipe only in spatial regions of its surface adjacent to clear apertures in the active matrix liquid crystal display, which minimizes light blockage from opaque areas of the active matrix liquid crystal display.

Light is emitted in blue, green, and red bundles, corresponding to blue, green, and red pixel elements of the liquid crystal display. Under certain conditions, this may permit removal of the green/red/blue absorptive filter used in the active matrix liquid crystal display. In the event that the absorptive filter must be kept, transmittance through it is significantly higher than for light existing from conventional backlights.

Light coupled out of the light pipe is quasi-collimated at a near normal exit angle compared to the wide angular field of view of emitted light from typical backlights. This is advantageous because the polarizers in the liquid crystal display work best at near normal incidence, resulting in a high contrast image. After passing through the active matrix liquid crystal display, a diffuser may be used to fill whatever viewing eyebox is desired.

The present invention may be used for a wide variety of applications including with flat panel displays for laptop computers, edgelit thin tail lamps, and light devices, and edgelit automotive displays.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a holographic s-polarized quasi-collimated full-color backlight in accordance with the principles of the present invention;

FIG. 2 illustrates a cross sectional view of an active matrix liquid crystal display employed in the backlight of FIG. 1;

DETAILED DESCRIPTION

Figure 3:
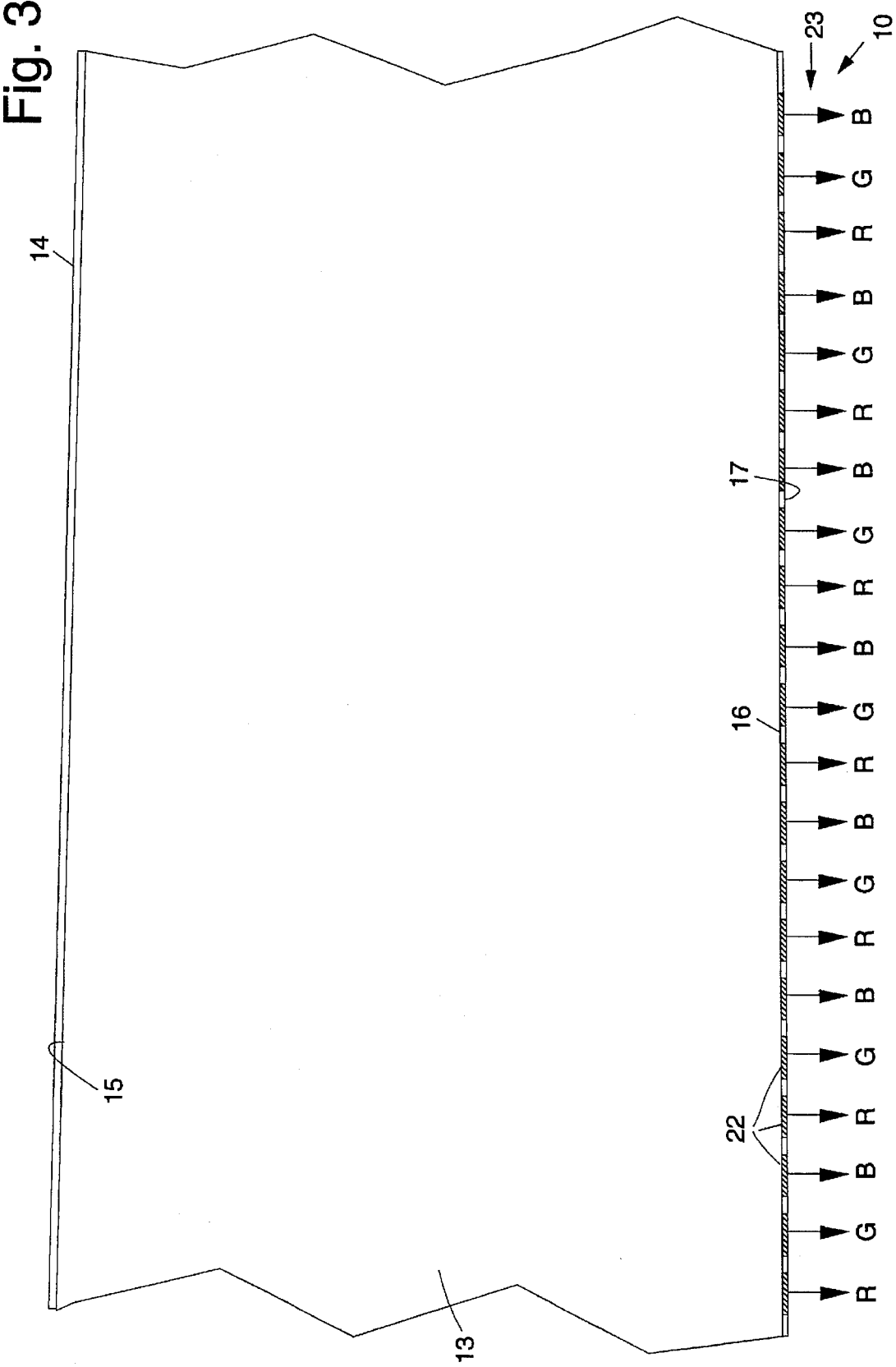
FIG. 3 shows an enlarged view of a portion of the backlight of FIG. 1.

Referring to the drawing figures, FIG. 1 illustrates a holographic s-polarized quasi-collimated full-color backlight 10 in accordance with the principles of the present invention, and a liquid crystal display system 20 employing the holographic backlight 10. FIG. 3 shows an enlarged view of a portion of the backlight 10 of FIG. 1.

The holographic backlight 10 shown in FIGS. 1 and 3 is a new type of backlight 10 that eliminates the disadvantages of conventional holographic backlights. The present holographic backlight 10 is comprised of a light source 11 such as a cold cathode fluorescent tube 11 and light injecting means 12 such as a non-imaging concentrator 12 for concentrating the light emitted by the light source 11 or fluorescent tube 11. A relatively thin flat tapered light pipe 13 that may be comprised of plastic, for example, is disposed to receive light transmitted by the concentrator 12. A phase retarding film layer 14 is disposed on a first surface 15 of the flat light pipe 13. However, in some instances, the phase retarding film layer 14 may not be required and is thus not necessary, or may provide zero retardance. A double hologram 16 is disposed on a second, output surface 17 of the light pipe 13, that preferably comprises a double-layer reflection/transmission hologram 16. Typically, the double-layer hologram 16 is laminated to the light pipe 13. A cover layer 19 (FIG. 5) is disposed on the exposed surface of the double-layer hologram 16. In the liquid crystal display system 20, light output from the holographic backlight 10 is applied to a liquid crystal display 21, such as an active matrix liquid crystal display 21 for projection thereby.

Referring to FIG. 2, it illustrates a cross sectional view of the active matrix liquid crystal display 21 employed in the backlight 10 of FIG. 1. As is generally well-known in the art, the active matrix liquid crystal display 21 is comprised of a plurality of layers as follows. An input polarizer 31 is disposed on an input surface that typically comprises a stretched polyester film, for example, and the input polarizer is disposed on a glass substrate 32 that has a thickness on the order of 1110 microns. A layer 33 comprising electronic circuitry is disposed adjacent to the glass substrate 32 that is on the order of up to 1 micron in thickness. An alignment layer 34 is disposed next to the layer of electronic circuitry 33 that is on the order of 50 nanometers in thickness. A liquid crystal material layer 35 having a plurality of clear apertures 35a disposed therein is disposed next to the alignment layer 34 that is on the order of 6–8 microns in thickness. An indium tin oxide layer 36 is disposed next to the liquid crystal material layer 35 that is on the order of 300 nanometers in thickness. A passivation layer 37 is disposed next to the liquid crystal material layer 35 that is on the order of 25 microns in thickness. A color filter layer 38 is disposed next to the passivation layer 37 that is on the order of 2–3 microns in thickness. A second glass substrate 39 is disposed next to the color filter layer 38 that is on the order of 1110 microns in thickness. An output polarizer 40 is disposed on the second glass substrate 39, and an antireflection film 41 is disposed over the polarizer.

The elements of the active matrix liquid crystal display 21 that are particularly relevant to the present invention are the input and output polarizers 31, 40, the color filter layer 38, and the liquid crystal material layer 35. The backlight 10 of the present invention produces s-polarized light output and is believed to permit the removal of the input polarizer from the structure of the active matrix liquid crystal display 21. In addition, the red/green/blue output of the present backlight 10 may also allow removal of the color filter from the structure of the active matrix liquid crystal display 21. Furthermore, the light output of the hologram doublet 16 of the present backlight is aligned to the clear apertures of the liquid crystal material layer of the active matrix liquid crystal display 21.

In operation, light from the cold cathode fluorescent tube 11 is injected into the light pipe 13, and is then diffracted off of the double-layer hologram 16. This produces quasi-collimated s-polarized light having well-defined spectral colors that is emitted from the light pipe 13 in an array of red, green, and blue patches of light 22 corresponding to red, green, and blue pixel elements 23 of the liquid crystal display 21.

Figure 4:
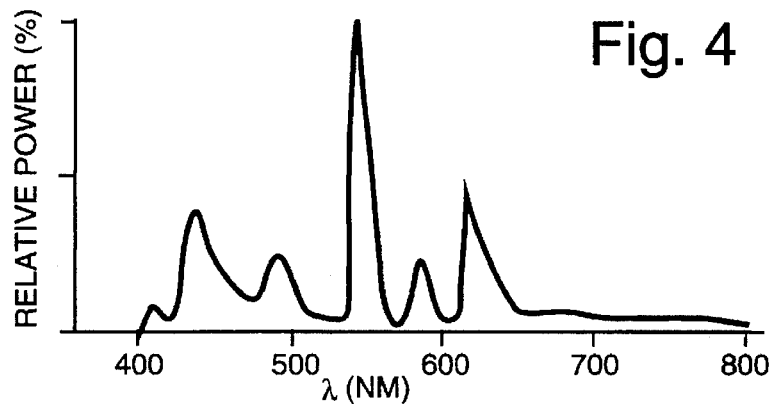
FIG. 4 shows a light emission spectrum of a cold cathode fluorescent tube.

The output spectrum of the cold cathode fluorescent tube 11 is shown in FIG. 4 and includes three wavelength bands in the blue, green, and red, each of which are roughly 30 nanometers wide. The light from the cold cathode fluorescent tube 11 is partially collimated by the non-imaging concentrator 12 so that the angle of incidence of its rays onto the front surface of the light pipe 13 is between 41° (the critical angle of total internal reflection) and 90° from normal. Therefore, light is totally trapped within the light pipe 13. The incident angles of light output of the cold cathode fluorescent tube 11 is injected into the light pipe 13 between angles of 41° and 90° at wavelengths from 410–690 nanometers.

Figure 5:
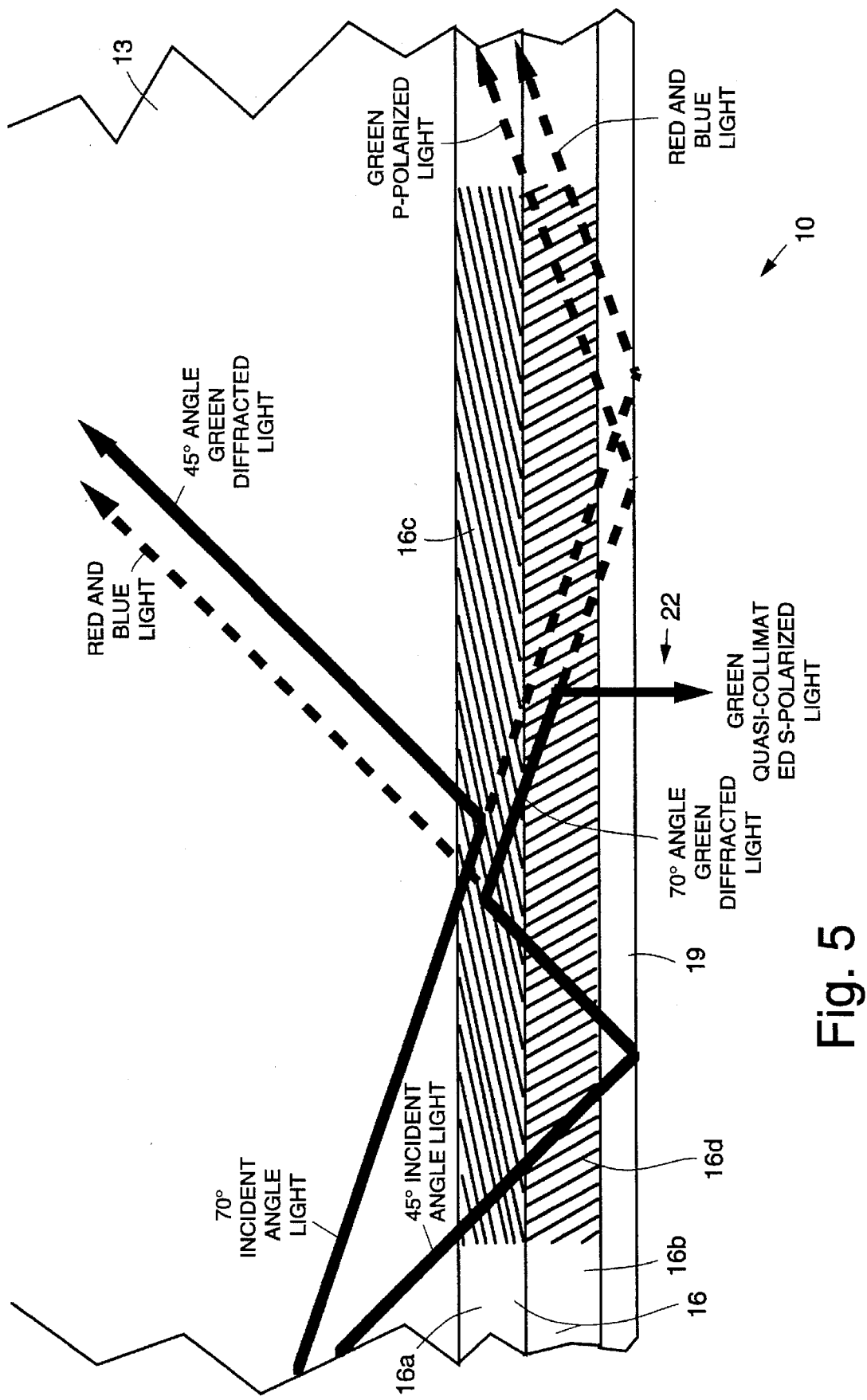
FIG. 5 illustrates a hologram doublet that is designed to take green light that is incident at 45° from normal in a light pipe and diffract it out of a light pipe at near-normal exit angle.

Referring to FIG. 5, the double-layer hologram 16 is comprised of a layer of trapped-beam reflection holograms 16a and a layer of trapped-beam transmission holograms 16b. Each hologram doublet 16 (reflection plus transmission holograms 16a, 16b) is designed to diffract incident light of a certain incident angle and wavelength band out of the light pipe 13 at near-normal to its surface. For example, FIG. 5 illustrates a hologram doublet 16 designed to take green light that is incident at 45° from normal in the light pipe 13 and diffract it out of the light pipe 13 at near-normal exit angle. The 45° light passes from the cold cathode fluorescent tube 11 directly onto the double-layer hologram 16 and passes through them essentially undiffracted, totally reflects off the cover 19/air interface, passes back through the transmission hologram 16d undiffracted, and is incident on the reflection hologram 16c.

Figure 6:
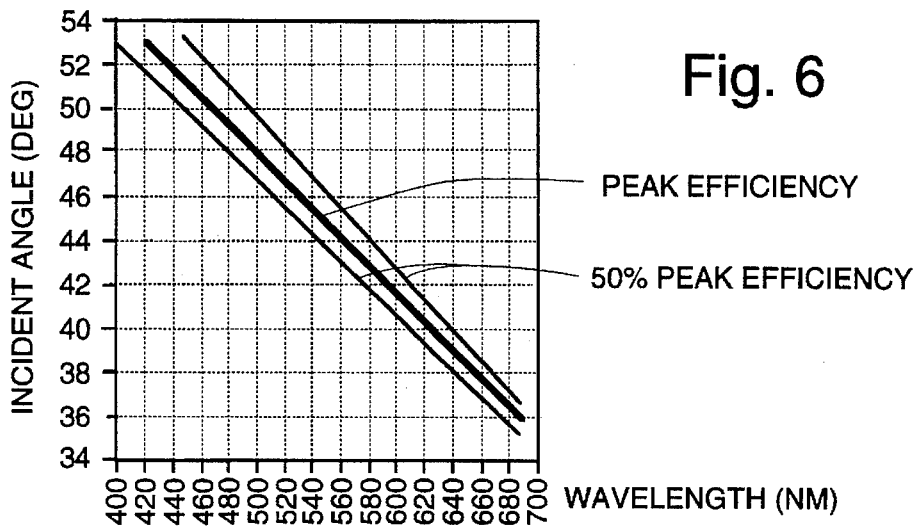
FIG. 6 shows a graph of high diffraction efficiency as a function of incident angle versus wavelength for a reflection hologram that is one element of the holographic doublet.
Figure 7:
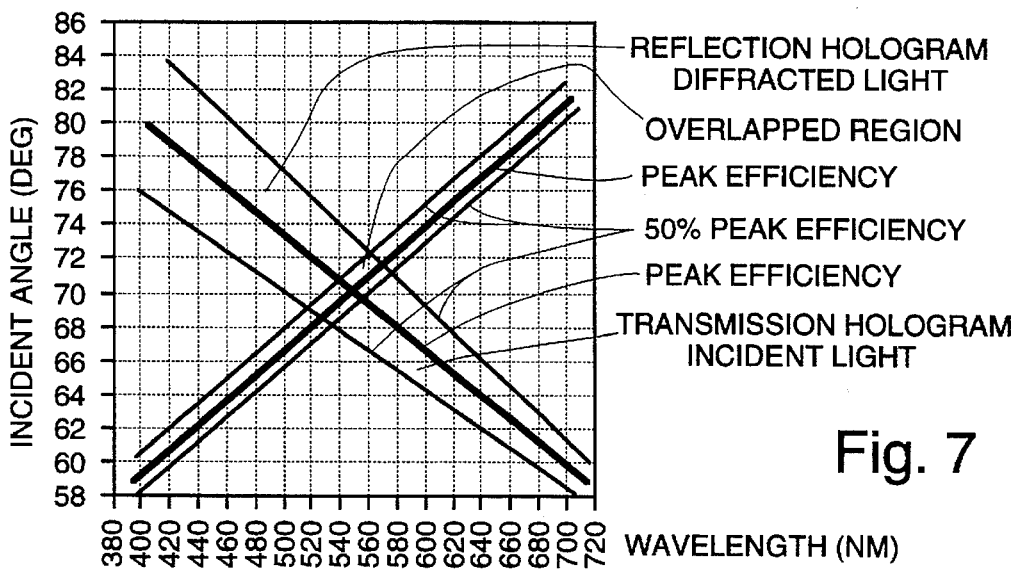
FIG. 7 shows a graph of high diffraction efficiency as a function of diffracted/incident angle versus wavelength for the reflection/transmission hologram.

The reflection hologram 16c efficiently diffracts a band of light with incident angles and wavelengths given in FIG. 6, and diffracts it into the angles shown in FIG. 7. The wavelength bandwidth of the reflection hologram 16c is fairly narrow for a given incident angle but its reflection band changes as the incident angle changes. In this manner it is capable of strongly diffracting light across the entire visible spectrum. Light of 555 nanometers in wavelength that is incident at 45° in the light pipe 13 diffracts off the reflection hologram 16 at 70° off-axis in the light pipe 13.

Figure 8:
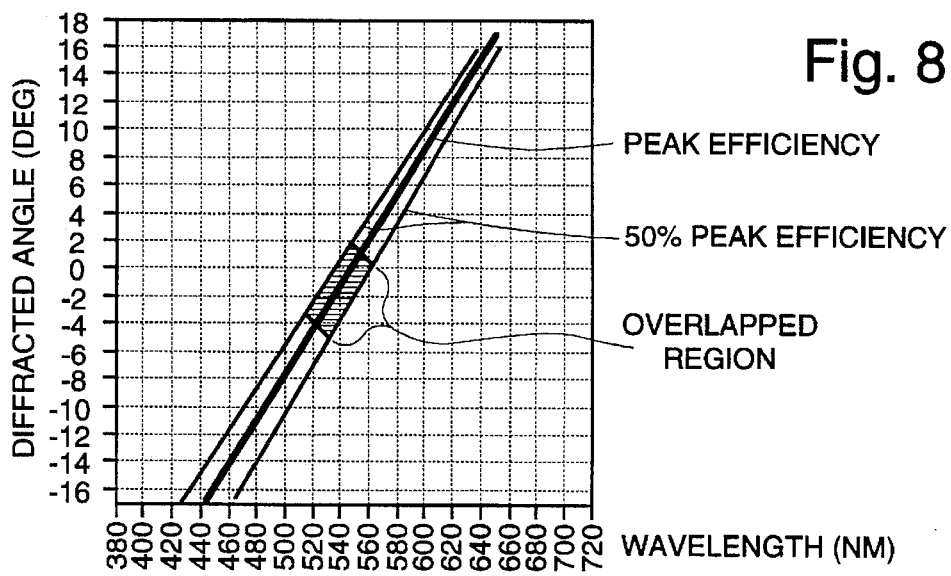
FIG. 8 shows a graph of high diffraction efficiency as a function of diffracted angle versus wavelength for the transmission hologram.

The light reflected off of the reflection hologram 16c is incident on the trapped-beam transmission hologram 16d. The diffraction characteristics of the trapped-beam transmission hologram 16d are shown in FIGS. 7 and 8. The angular bandwidth of the transmission hologram 16d is narrow for a given wavelength, but when illuminated by white light, it is capable of strongly diffracting light from a wide range of incident angles. Light at 555 nanometers in wavelength that is incident on the transmission hologram 16b at 70° off-axis in the light pipe 13 is strongly diffracted on-axis at 0° from normal.

The reflection hologram 16c and transmission hologram 16d working together strongly diffract the green light whose incident angles were centered about 45°. The light is diffracted out of the light pipe 13 in a quasi-collimated beam. The net effect of the hologram doublet 16 is to select a small spectral and angular component of the light incident from the cold cathode fluorescent tube 11 and diffract it out of the backlight 10.

The emitted light is quasi-collimated because the liquid crystal display 21 typically employs the input and output polarizers 31, 38 and therefore has high contrast only for near-normal incidence light. This is why the image in laptop computers loses contrast rapidly when it is viewed off-axis. However in the present invention, only near-normal light is incident on the liquid crystal display 21. If one desires a large viewing field of view, a controlled diffusing screen (such as a Physical Optics Corporation light shaping diffuser, for example) of the desired vertical and horizontal angular spread may be employed after the liquid crystal display 21. Therefore, a viewer will see a high contrast image over a large and well-defined viewing area, which is not possible with current displays.

The transmission hologram 16d strongly diffracts s-polarized light only. The p-polarized green light passes through the transmission hologram 16d essentially undiffracted. Therefore, the emitted light is highly polarized which allows it to pass through the active matrix liquid crystal display 21 with high transmittance.

The light that is incident on the hologram doublet 16 at 45° but which is not green passes through the hologram doublet undiffracted, and reflects off the cover 19/air interface, transmits through the hologram doublet 16, and back into the light pipe 13 at 45°. The s-polarized 70° incident green light strongly reflects off of the reflection hologram 16c and back into the light pipe 13 at a 45° off-axis angle. The 70° incident angle blue and red light (and p-polarized green light) pass through the hologram doublet 16 undiffracted, reflect off the cover 19/air interface, and pass through the hologram doublet 16 a second time undiffracted and re-enter the light pipe 13 at 70° off axis.

Figure 9:
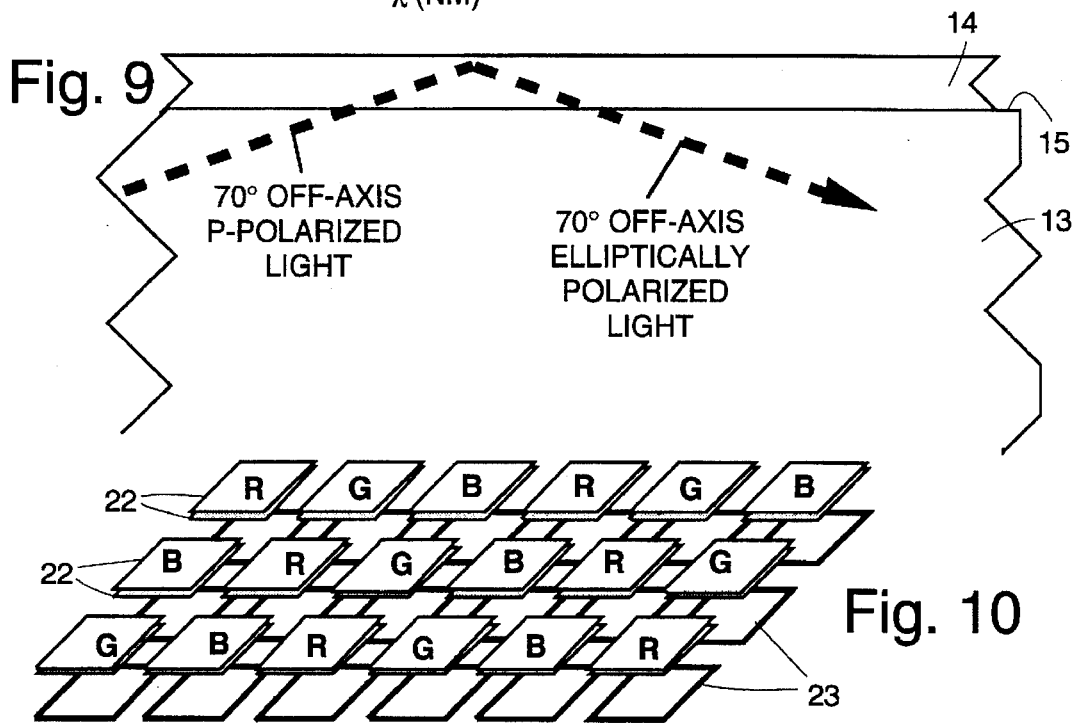
FIG. 9 shows how a phase retarding film layer rotates the polarization of incident light.

On the opposite side of the light pipe 13 the phase retarding film layer 14 imparts a phase retardation $\Delta\phi$ to the incident light. With reference to FIG. 9, the green p-polarized light at 70° off axis angle and which is incident on the phase retarding film layer 14 passes through the phase retarding film layer 14, reflects off the phase retarding/air interface, and passes through the phase retarding film layer 14 a second time. The resultant beam is elliptically polarized with a phase retardation $2\Delta\phi$ (plus a small phase retardation component due to the reflection off of the phase retarding layer 14/air interface). The purpose is to gradually convert p-polarized light back into s-polarized light so it is usable by the hologram 16.

For example, assume $2\Delta\phi=90°$. In this case, the green p-polarized light incident on the phase retarding film layer 14 at 70° emerges from a double pass through the retarding film layer 14 as circularly polarized light so that 50% of the light is s-polarized and 50% is p-polarized. When the 70° circularly polarized component strongly another green diffracting hologram doublet 16, the s-polarized component strongly diffracts off of the reflection hologram 16c at 45° (see FIG. 5) while the p-polarized component passes through undiffracted. The 45° diffracted s-polarized light is converted by the phase retarding film layer 14 into 50% s, 50% p at 45°. The s-polarized 45° light encountering another green diffracting doublet 16 is diffracted by the doublet 16 out into ambient space. In this manner, 25% of the wasted polarized 70° light eventually is reconverted to usable diffracted s-polarized light. Calculations may be performed to determine the optimum phase retardance for a given application.

The light pipe 13 is purposefully tapered so that direct rays from the cold cathode fluorescent tube 11 which are off-axis greater than 45° will gradually be steered more on-axis until they reach −45° and exit the backlight 10 through one of the hologram doublets 16. Likewise, highly off-axis undiffracted light left over from previous encounters with the hologram doublets 16 gets recycled by gradually decreasing in off-axis angle (e.g., 70°, then 65°, then 60° . . . , 45°) as it encounters multiple bounces off of the tapered light pipe 13. It also gets polarization scrambled so that when it returns to 45° off-axis incident angle and re-encounters a green diffracting hologram doublet 16 approximately 50% of its light will be s-polarized and will efficiently diffract out of the backlight 10.

The previous discussion has focused on a hologram doublet 16 that strongly diffracts 45° off-axis light into a 0° exit angle with respect to normal. However, it is possible to design the hologram doublet 16 to strongly diffract light that is incident at an angle other than 45°. In fact, the structure of the hologram doublet 16 may be filled with red-, green-, and blue-diffracting hologram doublets 16 designed to efficiently diffract a wide variety of different incident angles. This is a method of utilizing different angular potions of the light emitted from the light source 11. This technique may be used in addition to or instead of the light pipe tapering technique in order to use as many angular portions of the light from the light source as possible.

Figure 11:
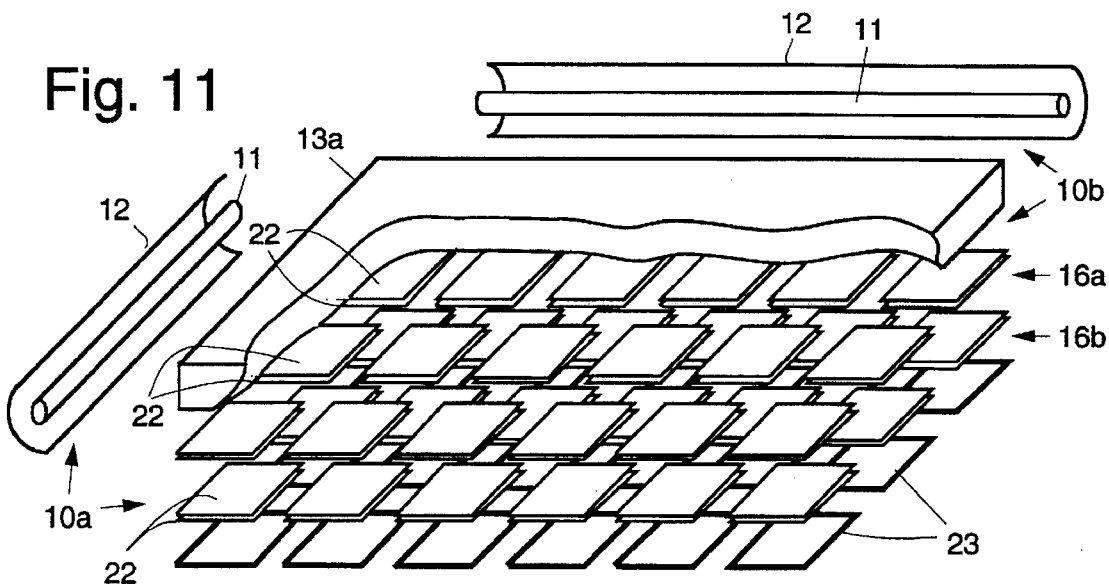
FIG. 11 shws additional embodiments of the present invention.

In addition, although the preferred embodiment of the present invention uses a tapered light pipe 13, an additional embodiments are shown in FIG. 11 that uses a plane-parallel untapered light pipe 13a and the hologram doublets 16 described above. Using a plane-parallel untapered light pipe 13a permits formation of other embodiments of the present invention. For example, as shown in FIG. 11, one embodiment is a backlight 10 comprising two subsystems 10a, 10b including (1) a first subsystem 10a comprising a first cold cathode fluorescent tube 11a, concentrator 12a, phase retarding layer 14, light pipe 13a, and double-layer hologram 16a, and (2) a second cold cathode fluorescent tube 11b, concentrator 12b, the phase retarding layer 14, light pipe 13b, and double-layer hologram 16b on the same light pipe 13 but where the second subsystem 10b is clocked 90° on the light pipe 13 relative to the first subsystem 10a. Since there is a 90° rotation between the two subsystems 10a, 10b, the holograms 16 of the first subsystem 10a ignore the light from the second subsystem 10b and vice versa. The result is a backlight 10 that uses two cold cathode fluorescent tubes 11 and which emits nearly twice as much s-polarized, quasi-collimated red/green/blue light as the tapered-light-pipe embodiment of the present invention described above.

Figure 10:
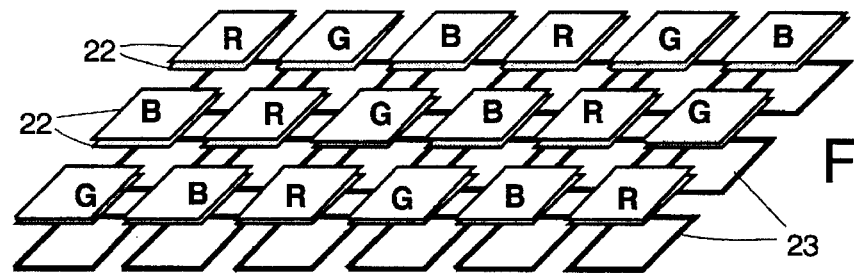
FIG. 10 illustrates position of red/green/blue holograms relative to an active matrix liquid crystal display of the holographic backlight of FIG. 1.

In summary, an array of green-diffracting hologram doublets 16, combined with a tapered light pipe 13 and a phase retarding film layer 14, is capable of emitting near-normal, s-polarized quasi-collimated green light in only those spatial surface areas of the light pipe 13 corresponding to clear aperture regions of the active matrix liquid crystal display 21. In a similar manner red-diffracting hologram doublets 16 and blue-diffracting hologram doublets 16 may be made, and the resultant pattern of red, green and blue diffracting holograms may be aligned to the red, green, and blue pixel elements 22 of the active matrix liquid crystal display 21 in the manner shown in FIG. 10. In some applications, it is possible using this technique to eliminate the color filter (not shown) in the active matrix liquid crystal display 21, which transmits only 20–30% of the white light incident upon it. However, even if color purity considerations necessitate the use of the color filter, the transmittance of colored light through the color filter (e.g. green light from the green-diffracting hologram doublet 16 transmitting through the green absorptive filter) will have a transmittance of much greater than 20–30%, typically on the order of from 50–60%.

The holographic backlight 10 works more efficiently than a conventional backlight by delivering green light to green pixel elements 22 of the liquid crystal display 1, preferentially emitting s-polarized light, converting some unusable p-polarized light into diffracted s-polarized light, delivering light spatially where it is needed, making the emitted light quasi-collimated to so that it passes through the liquid crystal display 21 with high contrast, and providing a tailored diffuser after the active matrix liquid crystal display 21 to give the viewer a desired viewing zone without losing image contrast.

It is not currently known what the total efficiency of the present holographic backlight 10 is, that is, how much light from the cold cathode fluorescent tube 11 is actually diffracted by the holograms 16. However, it is believed that the overall efficiency is greater than that of conventional backlights, which produces a liquid crystal display 21 with higher display brightness, reduced battery power requirements, increased battery lifetime, and higher contrast over a wider viewing angle.

Thus there has been described new and improved holographic backlights and liquid crystal display systems employing same. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A holographic backlight comprising:
    a white light source for emitting white light;
    a light pipe;
    light injecting means for injecting the white light from the white light source into the light pipe;
    a phase retarding layer disposed on a first surface of the light pipe; and
    a double-layer reflection/transmission hologram disposed on an output surface of the light pipe, wherein the double-layer reflection/transmission hologram produces quasi-collimated s-polarized light having well-defined spectral colors that is transmitted in an array of red, green, and blue patches of light.

2. The backlight of claim 1 wherein the white light source comprises a cold cathode fluorescent tube.

3. The backlight of claim 1 wherein the means for injecting comprises a non-imaging concentrator.

4. The backlight of claim 1 wherein the light pipe is tapered.

5. The backlight of claim 1 wherein the double-layer reflection/transmission hologram comprises an array of reflection/transmission hologram doublets wherein each hologram doublet diffracts incident light of a certain incident angle and wave length band so as to select different angular position of the light injected into the light pipe.

6. The backlight of claim 1 wherein the phase retarding layer has zero retardance.

7. The backlight of claim 1 wherein the double-layer reflection/transmission hologram is laminated to the first surface of the tapered light pipe.

8. The backlight of claim 1 wherein the light pipe comprises a plane-parallel light pipe and wherein the backlight further comprises:
    a second white light source for emitting white light;
    second light injecting means for injecting the whim light from the second white light source into the light pipe; and
    a second double-layer reflection/transmission hologram disposed on an output surface of the light pipe that is oriented orthogonal to the other hologram.

9. A holographic backlight for use with a liquid crystal display, said backlight comprising:
    a cold cathode fluorescent tube for emitting white light;
    a non-imaging concentrator for concentrating the white light emitted by the fluorescent tube;
    a substantially flat tapered light pipe for receiving concentrated light provided by the concentrator and for providing an emitting surface that emits white light of substantially uniform brightness;
    a phase retarding film layer disposed on a first surface of the tapered light pipe; and
    a double-layer reflection/transmission hologram disposed on a second, output surface of the tapered light pipe; and
    wherein light emitted by the cold cathode fluorescent tube is injected into the tapered light pipe and is diffracted off of the double-layer hologram so that quasi-collimated s-polarized light having well-defined spectral colors is transmitted thereby as an array of red, green, and blue patches of light corresponding to the clear apertures of the red, green, and blue elements of the liquid crystal display.

10. The system of claim 9 wherein the liquid crystal display comprises an active matrix liquid crystal display.

11. The system of claim 9 wherein the double-layer reflection/transmission hologram is laminated to the first side of the tapered light pipe.

12. A liquid crystal display system comprising:
    a cold cathode fluorescent tube for emitting white light;
    a non-imaging concentrator for concentrating the white light emitted by the fluorescent tube;
    a light pipe for receiving the white light transmitted by the non-imaging concentrator;

a phase retarding film layer disposed on a first surface of the light pipe;

a double-layer reflection/transmission hologram disposed on a second, output surface of the light pipe for diffracting the light emitted from the light pipe to produce quasi-collimated s-polarized light having well-defined spectral colors;

a liquid crystal display disposed adjacent the hologram for receiving the quasi-collimated s-polarized light transmitted by the hologram; and a diffusing screen to spread the light into a desired angular viewing zone;

wherein light emitted by the cold cathode fluorescent tube is injected into the light pipe and is diffracted off of the double-layer hologram to produce the quasi-collimated s-polarized light having well-defined spectral colors which is transmitted as an array of red, green, and blue patches of light corresponding to the clear apertures of the red, green, and blue elements of the liquid crystal display.

13. The system of claim 12 wherein the liquid crystal display comprises an active matrix liquid crystal display.

14. The system of claim 12 wherein the light pipe is tapered.

15. The system of claim 12 wherein the light pipe comprises a plane-parallel light pipe and wherein the system further comprises:

a second white light source for emitting white light;

second light injecting means for injecting the white light from the second white light source into the light pipe; and a second double-layer reflection/transmission hologram disposed on an output surface of the light pipe that is oriented orthogonal to the other hologram.

* * * * *